United States Patent
Banister

(10) Patent No.: US 6,876,641 B2
(45) Date of Patent: Apr. 5, 2005

(54) FAST FEEDBACK CHANNEL WITH FLEXIBLE BIT RELIABILITY FOR WIRELESS COMMUNICATIONS

(75) Inventor: Brian Banister, San Diego, CA (US)

(73) Assignee: Via Telecom Co., Ltd., San Diego, CA (US)

( * ) Notice: Subject to any disclaimer, the term of this patent is extended or adjusted under 35 U.S.C. 154(b) by 871 days.

(21) Appl. No.: 09/834,417

(22) Filed: Apr. 12, 2001

(65) Prior Publication Data

US 2001/0048694 A1 Dec. 6, 2001

Related U.S. Application Data

(60) Provisional application No. 60/197,145, filed on Apr. 14, 2000.

(51) Int. Cl.[7] .............................................. H04J 13/00
(52) U.S. Cl. ...................................... 370/335; 370/342
(58) Field of Search ................................ 370/335, 342, 370/441; 375/140, 141; 455/522

(56) References Cited

U.S. PATENT DOCUMENTS

| | | | | | |
|---|---|---|---|---|---|
| 5,398,247 | A | * | 3/1995 | Delprat et al. | 370/347 |
| 6,690,944 | B1 | * | 2/2004 | Lee et al. | 455/522 |
| 6,771,632 | B2 | * | 8/2004 | Dick et al. | 370/342 |
| 2003/0231720 | A1 | * | 12/2003 | Jaffe et al. | 375/340 |

OTHER PUBLICATIONS

Hagenauer, et al., "Iterative Decoding of Binary Block and Convolutional Codes", IEEE Transactions of Informatin Theory, vol. 42, No. 2, Mar. 1996, pp. 429–445.

Andrew J. Viterbi, "An Intuitive Justification and a Simplified Implementation of the MAP Decoder for Convolutional Codes", IEEE Journal on Selected Areas in Communications, vol. 16, No. 2, Feb. 1998, pp. 260–264.

Benedetto, et al. "Serial Concatenation of Interleaved Codes: Performance Analysis, Design, and Iterative Decoding", IEEE Transactions on Information Theory, vol. 44, No. 3, May 1998, pp. 909–926.

* cited by examiner

*Primary Examiner*—Melvin Marcelo
(74) *Attorney, Agent, or Firm*—Martin J. Jaquez, Esq.; Jaquez & Associates

(57) ABSTRACT

A single physical channel carries "fast feedback" information in such a way that each type of data is on a physical sub-channel. The sub-channels are not "logical" channels in that they cannot be separated by logical functions alone because some knowledge of the modulation mechanisms is required. Each sub-channel is independently channel coded (this is outer channel coding if an inner code is applied). The resulting code symbols from all sub-channels are then merged into one set of symbols. These code symbols can then optionally be concatenation interleaved and inner channel coded, if the performance enhancement is desired and the complexity is acceptable. The result is then extended by code symbol repetition to provide a total number of symbols greater than or equal to one of the possible quantities of symbols per frame supported by the physical channel, and then decimated (symbols deleted) to provide a number of symbols equal to one of the allowable quantities of symbols per frame. The result is then interleaved, and transmitted over the physical channel.

20 Claims, 2 Drawing Sheets

FIGURE 2

10 CODED SYMBOLS

| s0 | s1 | s2 | s3 | s4 | s5 | s6 | s7 | s8 | s9 |

20 SYMBOLS AFTER REPETITION

| s0 | s0 | s1 | s1 | X s2 | s2 | s3 | s3 | X s4 | s4 | s5 | s5 | s6 | s6 | X s7 | s7 | s8 | s8 | X s9 | s9 |

16 SYMBOLS AFTER DECIMATION

| s0 | s0 | s1 | s1 | s2 | s3 | s3 | s4 | s5 | s5 | s6 | s6 | s7 | s8 | s8 | s9 |

FAST FEEDBACK CHANNEL WITH FLEXIBLE BIT RELIABILITY FOR WIRELESS COMMUNICATIONS

This application claims the benefit of provisional application No. 60/197,145, filed Apr. 14, 2000.

BACKGROUND OF THE INVENTION

1. Field of the Invention

This invention relates to digital wireless systems, and most particularly, to wireless communications such as those using CDMA modulation.

2. Description of the Related Art

In certain digital wireless systems, "fast feedback" information should be grouped onto one channel for transmission. This is typically physical layer or very low layer message processing related information which should be transmitted and received quickly, and hence does not go through the normal higher protocol layer flow. The classic example is closed loop power control implemented in CDMA systems to overcome the "near-far" problem. The discussion is relevant for both forward link (base station "BS" transmitting to mobile station "mobile") and reverse link (vice-versa) data transmission.

In newer proposals for next generation systems various new fast feedback channels have been discussed. In the following, these are the discussed from the mobile perspective (reverse link). These include:

transmit sector indication—(preferably frame synchronous) implements a "fast handoff" by allowing the mobile to decide which of several active basestations will transmit in the next frame. This provides a priori "selection diversity" gain because the mobile can select the basestation that provides the largest signal power. This should be fast to select the best possible basestation based on changing channel conditions.

power control indication—requests increase or decrease of transmitter power in order to provide just enough power to the mobile to allow successful demodulation while minimizing interference to other mobiles. This should be fast to track out the variations of the changing channel. This is typically a simple up/down indication.

fast frame acknowledgments—(preferably frame synchronous) allows the BS to immediately retransmit frames of data received by the mobile in error. The immediate transmission allows the mobile to combine the received symbols from the previous (unsuccessful) transmission with the newly received symbols to improve the probability of successful reception. In order to keep the mobile's memory storage requirements to a minimum this should be done quickly, requiring fast acknowledgments. (This scheme is termed "hybrid-ARQ").

SNR (Signal-to-Noise Ratio) indications—(preferably frame synchronous) signal to noise indications can be transmitted to the BS to allow it to decide how and what to transmit in the next frame. Specifically, current proposals use adaptive modulation and coding, where the transmit data and coding rate is adjusted according the signal strength received by the mobile. These should be fast to allow the BS to appropriately and quickly select the modulation for the next frame of data. Alternatively, the mobile may directly request a specific data rate.

rate information—(preferably frame synchronous) the mobile can indicate to the BS the data rate of the mobile's transmission, in order to facilitate the BS's decoding of the data. Preferably, this would be transmitted synchronously with each data frame.

adaptive antenna array information—the BS may use transmit adaptive antenna arrays, which typically require some feedback from the mobile in order for the BS to adjust its transmit weights. This should be transmitted fast enough to allow adequate weight adaptation rates.

All of these things should be transmitted and received quickly based on the changing conditions of the environment, and many of them are frame synchronized. These requirements mean that they cannot be treated as "signaling" which passes through the higher protocol layers of the receiver and transmitter. Rather, these can all be considered to be physical layer related data, and as such it is reasonable to consider special physical channels for transmission. In the past, when power control was the only such information, the power control bits where simply "punctured" onto the data transmission (that is, transmit "Tx" symbols of the data were erased and replaced with power control bits which were transmitted in their stead). With the increasing amount of information and the increasing required reliability of the information, new independent physical channels have been considered. This has not, however, been considered from a single, unified, flexible framework.

The present proposals have all included ad hoc physical channels (distinguished by orthogonal codes in CDMA) for these feedback terms. This increases the number of channels, which causes increased transmitter and receiver complexity (for DS-CDMA each physical channel will require one despread-accumulator) and increases the peak-to-average ratio of the transmitted waveform (which increases power consumption in the radio).

It would be desirable to improve upon these proposals.

SUMMARY OF THE INVENTION

The present invention uses a single physical channel to carry "fast feedback" information, but in such a way that each type of data is on what may be termed a physical sub-channel. They are not "logical" channels in that they cannot be separated by logical functions alone, but some knowledge of the modulation mechanisms is required. Each sub-channel is independently channel coded (this is outer channel coding if an inner code is applied). The resulting code symbols from all sub-channels are then merged into one set of symbols. These code symbols can then optionally be concatenation interleaved and inner channel coded, if the performance enhancement is desired and the complexity is acceptable. The result is then extended by code symbol repetition to provide a total number of symbols greater than or equal to one of the possible quantities of symbols per frame supported by the physical channel, and then decimated (symbols deleted) to provide a number of symbols equal to one of the allowable quantities of symbols per frame. The result is then interleaved, and transmitted over the physical channel.

It is believed that the present invention provides at least the following advantages:

lower peak to average power ratio. This technique uses one physical code channel onto which all of the sub-channels are modulated. Transmission of one code channel will have a lower peak to average power ratio than transmission of several code channels. This saves power in the power amplifier.

uniform mechanism with flexibility to enable and disable fast feedback sub-channels, as well as to later add as yet undefined sub-channels.

conservation of Walsh orthogonal code space by using only 1 channel for all fast feedback channels.

improved information reliability by applying coding over the multiple channels rather than transmitting each one independently (if the serial concatenated coding with the inner code is used).

desired reliability of each sub-channel can be independently achieved through use of independent outer codes simplified implementation in the transmitter, one modulator, and in the receiver, one despreader, for CDMA systems.

BRIEF DESCRIPTION OF THE DRAWINGS

Other objects and advantages of the invention will become apparent upon reading the following detailed description and upon reference to the accompanying drawings in which:

FIG. 2 diagrammatically illustrates a symbol decimation scheme that may be used in connection with the embodiment shown in FIG. 1.

Figure 1:
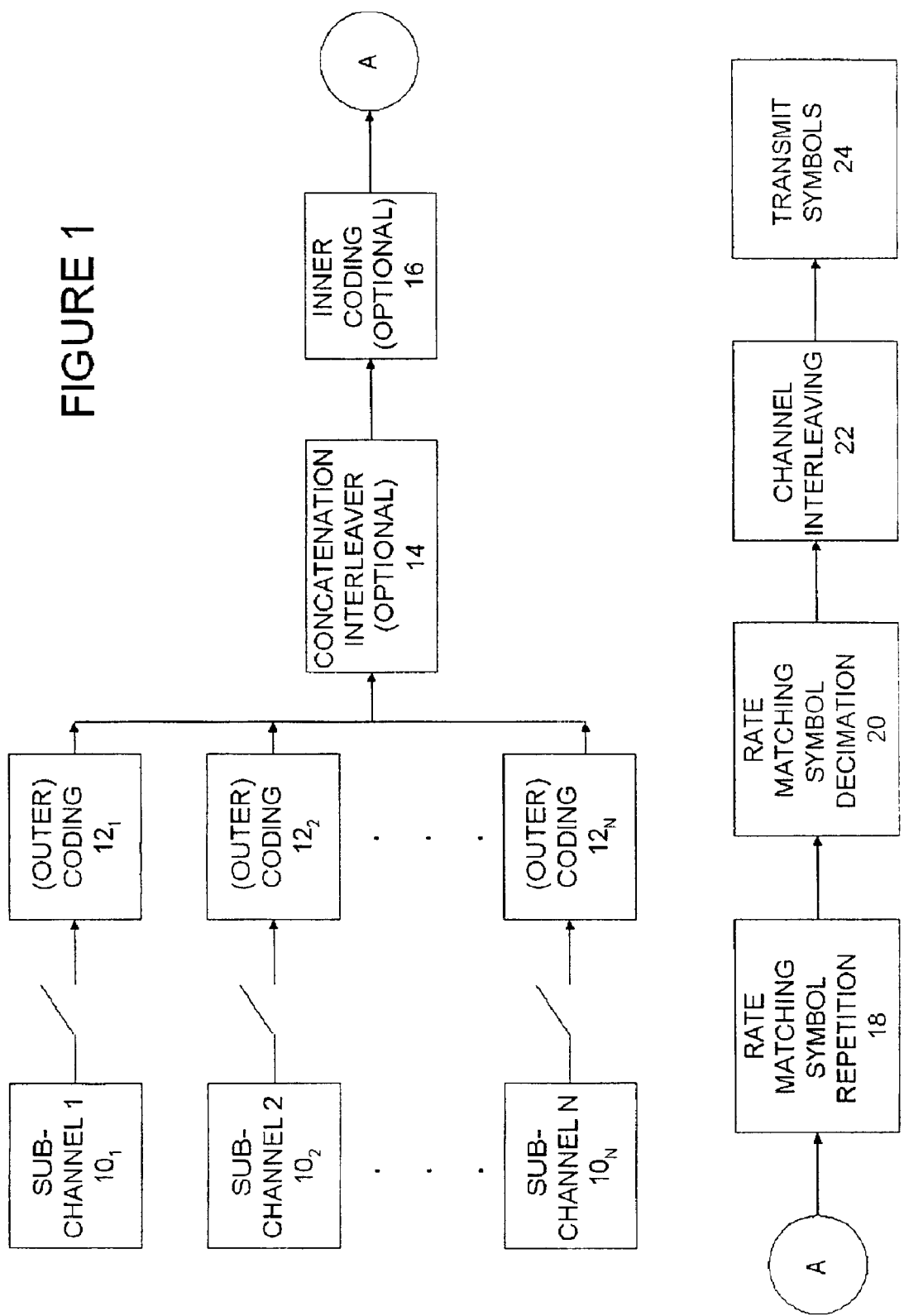
FIG. 1 is a block diagram of an embodiment of the present invention.

Although the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention as defined by the appended claims.

DETAILED DESCRIPTION OF THE INVENTION

This specification describes methods and apparatus pertaining to CDMA systems. However, it will be appreciated that the present invention is not restricted to CDMA.

Nomenclature

It is common to define a "physical channel" as some physically defined transmission medium and modulation type. The physical channel can carry separate "logical channels". The logical channels can use the same physical channel, and a logical channel can use different physical channels at different times.

CDMA uses Walsh codes to generate orthogonal code channels. Typically, such a code channel is synonymous with a physical channel, but it is possible to share that code channel between physical channels in a time multiplexed way.

This invention will require a unique definition of a "layered" physical channel, wherein a code channel carries different physical channels, but they are not time multiplexed but rather co-interleaved with independent coding. These will be termed physical sub-channels.

Description

A block diagram of an embodiment of the present invention is shown in FIG. 1, which may be implemented for a mobile device or a base station. A plurality of sub-channels $10_1$ through $10_N$ are coupled through a respectively plurality of switches to a respective plurality of outer coding devices $12_1$ through $12_N$. This invention uses a single physical channel to carry the various quantities, but in such a way that each type of data is on what may be termed a physical sub-channel. The sub-channels $10_1$ through $10_N$ are not "logical" channels in that they cannot be separated by logical functions alone, but some knowledge of the modulation mechanisms is required. The outer coding devices $12_1$ through $12_N$ perform outer channel coding if an inner code is applied. Many types of outer coding may be applied. For example, for low reliability, simple repetition may be used, for higher reliability convolutional or block codes may be used, and for highest reliability, orthogonal signaling may be used.

The resulting code symbols output from the outer coding devices $12_1$ through $12_N$ from all sub-channels are then merged into one set of symbols. These code symbols can then optionally be concatenation interleaved by concatenation interleaver 16 and inner coder 18, respectively, if the performance enhancement is desired and the complexity is acceptable.

The resulting output is then extended by a code symbol repetition block 18 to provide a total number of symbols greater than or equal to one of the possible quantities of symbols per frame supported by the physical channel. The result is then decimated (symbols deleted) by decimator 20 to provide a number of symbols equal to one of the allowable quantities of symbols per frame (i.e. rate matching). The result is then interleaved by interleaver 22 and transmitted by transmitter 24 over the physical channel.

The rate matching performed by the decimator 20 can be performed in any reasonable way. For example, one can use the frame matching techniques set forth in the co-pending and commonly-assigned U.S. patent application Ser. Nos. 09/686,786 and 09/687,700, both of which are entitled "Frame Matching Method", and both of which are incorporated herein by reference. Another suggested method, which is similar to if not the same as a rate matching algorithm described in IS-2000-A (see IS-2000-A, "Physical Layer Standard for cdma2000 Spread Spectrum Systems", March 2000), is as follows. Let C be the total number of coded channel symbols, obtained by concatenation of the physical sub-channels and subsequent inner coding if performed, and let S be the lowest number of physical symbols that can be transmitted in the frame time such that $S \geq C$. If S=C, then the rate is matched and the symbols can be channel interleaved and transmitted. If S>C, then C is expanded to NC by N times symbol repetition (each symbol is repeated N times), where N is the smallest integer such that $NC \geq S$. If NC=S, then the rate is matched, and the symbols can be interleaved and transmitted. Otherwise, symbol decimation is performed by deleting every $$D = \left\lfloor \frac{NC}{NC-S} \right\rfloor$$

symbol until (NC−S) symbols have been deleted. Since all symbols will have been repeated at least once, this decimation will ensure that all symbols get transmitted at least once. This spreads any degradation almost evenly through all the sub-channels and all of the coded symbols. This is illustrated in FIG. 2, where 10 coded symbols (S through s9) are repeated to form 20 symbols. Then, the first S2 and s7 symbols, as well as, the second s4 and s9 symbols are removed from the 20 symbols to form 16 symbols after decimation. Note that there may be a set of different allowable rates $S_k$, in which case the lowest rate that can accommodate the enabled sub-channels is used, min ($S_k$, such that $S_k \geq C$).

Each of the sub-channels $10_1$ through $10_N$ is a physical sub-channel (as opposed to a logical channel) by virtue of the fact that each is individually coded, and decoded separately. Each of the sub-channels $10_1$ through $10_N$ can be coded according to its own needs. That is, any of the sub-channels $10_1$ through $10_N$ requiring high reliability can have strong coding and any others of the sub-channels $10_1$ through $10_N$ sub-channels not requiring high reliability can have weak coding. Coding for a channel can be simple (such as symbol repetition, independent of the rate matching symbol repetition) or complex as required.

For one embodiment, each sub-channel $10_1$ through $10_N$ can be turned on or off according to whether or not the associated functionality is enabled. For example, adaptive array feedback data will only be enabled if adaptive transmit arrays are enabled. The algorithm can perform automatic rate matching, so that for any configuration of enabled sub-channels the transmitted waveform is well defined and can be decoded. Additional sub-channels can be added in a reverse compatible manner, for example, by tacking them on at the end as long as the maximum physical channel symbol rate is not exceeded. In this way new channels can be added as new capabilities arise.

The data rate is a function of which sub-channels are enabled. This does not require blind rate determination, as the sub-channel configuration would be negotiated between mobile and base station, for example, through higher layer signaling.

The inclusion of concatenation interleaving and inner channel coding is optional, but will increase the reliability of the transmission. It is known from information theory that coded transmissions can asymptotically approach the capacity limits as frame size becomes large. Hence, by coding all of the sub-channels together and thus increasing the frame size, the reliability of each sub-channel can be made to be greater than by transmitting the sub-channel alone. The inclusion of an inner code is similar to well known serial concatenated code techniques (see Benedetto, S., Divsalar, D., Montorsi, G., Pollara, F. "Serial concatenation of interleaved codes: performance analysis, design, and iterative decoding", *IEEE Transactions on Information Theory*, vol.44, (no.3), IEEE, May 1998) but it differs in that there are several independent outer codes, each of which is chosen according to differing requirements. Thus, the present invention is believed to be a new serial concatenated code technique.

The decoding at the receiver depends on the complexity of the outer codes and the desired performance. The inner code would typically be a tailed convolutional code, as this is easily implemented independent of the number of bits in the frame, which is dependent on which sub-channels are enabled and their outer codes. The decoding can be done by generating either soft or hard bit decisions from the outer code and then applying these decisions to the inner decoder for each sub-channel. Generating hard decisions from the inner decoder would be done simply by the well-known Viterbi algorithm. Soft decisions would provide better performance and can be generated by a number of techniques, which are becoming well known with the advent of turbo decoding of parallel concatenated codes (see Hagenauer, J., Offer, E., Papke, L. "Iterative Decoding of Binary Block and Convolutional Codes", *IEEE Transactions on Information Theory*, Vol. 42, No. 2, March 1996 and Viterbi, A. "An Intuitive Justification and a Simplified Implementation of the MAP Decoder for Convolutional Codes", *IEEE Journal on Selected Areas in Communications*, Vol. 16, No. 2, February 1998.)

Note also that the decoding could be performed in an iterative fashion like Turbo decoding. This would provide better performance, but is probably undesirable in the context of fast feedback data due to the increased delay that would be incurred. Even without iterative decoding this mechanism should provide better performance than would be obtained without the concatenation of the multiple outer codes and the inner code.

Finally, if the embodiment shown in FIG. 1 is implemented as part of a mobile device, it should be noted that frame acknowledgments should be sent by the mobile device early enough to be decoded by a corresponding base station and implemented in time for some specific frame, whereas antenna weight update information presumably has no specific timing requirements.

Conclusion

Numerous variations and modifications will become apparent to those skilled in the art once the above disclosure is fully appreciated. It is intended that the following claims be interpreted to embrace all such variations and modifications.

What is claimed is:

1. A method of combining a plurality of sub-channels to form a single physical channel, comprising the steps of:
   individually channel coding at least a first and a second sub-channel of the plurality of sub-channels to form respective first and second resulting code symbols;
   merging the first and second resulting code symbols to form a combined set of symbols;
   interleaving the combined set of symbols so that the combined set of symbols can be transmitted over the single physical channel.

2. The method as set forth in claim 1 comprising the step of concatenation interleaving the combined set of symbols to form a concatenation interleaved set.

3. The method as set forth in claim 2 comprising the step of inner coding the concatenation interleaved set to form an inner coded set.

4. The method as set forth in claim 1 comprising the step of extending the combined set of symbols by code symbol repetition to form an extended symbol set.

5. The method as set forth in claim 4 comprising the step of decimating the extended symbol set to attain an allowable quantity of symbols per frame.

6. The method as set forth in claim 1 wherein a third sub-channel of the plurality of sub-channels is individually channel coded to form third resulting code symbols and the third resulting code symbols are combined with the first and second resulting code symbols to form the combined set of symbols.

7. The method as set forth in claim 6 wherein the third sub-channel can be turned "on" and "off" such that:
   when "on", the third resulting code symbols are combined with the first and second resulting code symbols to form the combined set of symbols; and
   when "off", the third resulting code symbols are not combined with the first and second resulting code symbols to form the combined set of symbols.

8. The method as set forth in claim 1 comprising the step of transmitting the combined set of symbols over the single physical channel.

9. The method as set forth in claim 8 comprising the step of receiving the combined set of symbols over the single physical channel and separating the combined set into the first and second sub-channels.

10. The method as set forth in claim 1 wherein the sub-channels cannot be separated from the combined set of symbols by logical functions without modulation mechanism knowledge.

11. An apparatus that recovers data transmitted on the first and second sub-channels that have been combined according to the method as set forth in claim 1.

12. The method as set forth in claim 1 wherein the first sub-channel carries data selected from the group consisting of:
- transmit sector indication information;
- power control indication information;
- fast frame acknowledgment information;
- signal-to-noise ratio (SNR) indication information;
- data rate information; and
- adaptive antenna array information.

13. An apparatus to combine a plurality of sub-channels to form a single physical channel, comprising:
- a first channel coder to individually channel code a first sub-channel of the plurality of sub-channels to form first resulting code symbols;
- a second channel coder to individually channel code a second sub-channel of the plurality of sub-channels to form second resulting code symbols;
- an interleaver to merge the first and second resulting code symbols to form a combined set of symbols and to interleave the combined set of symbols so that the combined set of symbols can be transmitted over the single physical channel.

14. The apparatus as set forth in claim 13 comprising a concatenation interleaver to interleave the combined set of symbols to form a concatenation interleaved set.

15. The apparatus as set forth in claim 14 comprising an inner coder to inner code the concatenation interleaved set to form a inner coded set.

16. The apparatus as set forth in claim 13 comprising rate matching symbol repeater to extend the combined set of symbols by code symbol repetition to form an extended symbol set.

17. The apparatus as set forth in claim 16 comprising a decimator to decimate the extended symbol set to substantially match an allowable quantity of symbols per frame.

18. The apparatus as set forth in claim 13 comprising a third channel coder to individually channel code a third sub-channel of the plurality of sub-channels to form third resulting code symbols and wherein the third resulting code symbols are combined with the first and second resulting code symbols to form the combined set of symbols.

19. The apparatus as set forth in claim 18 wherein the third sub-channel can be turned "on" and "off" such that:
- when "on", the third resulting code symbols are combined with the first and second resulting code symbols to form the combined set of symbols; and
- when "off", the third resulting code symbols are not combined with the first and second resulting code symbols to form the combined set of symbols.

20. The apparatus as set forth in claim 13 comprising a transmitter to transmit the combined set of symbols over the single physical channel.

* * * * *